Mar. 13, 1923.

A. L. JOHNSON.
EGG TURNER.
FILED APR. 25, 1922.

1,448,594.

Inventor
A. L. Johnson,
By
Attorney

Patented Mar. 13, 1923.

1,448,594

UNITED STATES PATENT OFFICE.

ALVIS L. JOHNSON, OF GUYMON, OKLAHOMA, ASSIGNOR OF ONE-HALF TO F. HINER DALE, OF GUYMON, OKLAHOMA.

EGG TURNER.

Application filed April 25, 1922. Serial No. 556,404.

*To all whom it may concern:*

Be it known that ALVIS L. JOHNSON, a citizen of the United States of America, residing at Guymon, in the county of Texas and State of Oklahoma, has invented new and useful Improvements in Egg Turners, of which the following is a specification.

The object of the invention is to provide an egg tray for incubators whereby the periodical turning of the eggs may be facilitated and the apron by which the eggs are supported may be held at the proper tension to insure the uniform turning thereof when the mechanism is operated; and with this object in view the invention consists in a construction and combination of parts of which a preferred embodiment is shown in the accompanying drawings, wherein:—

Figure 1:
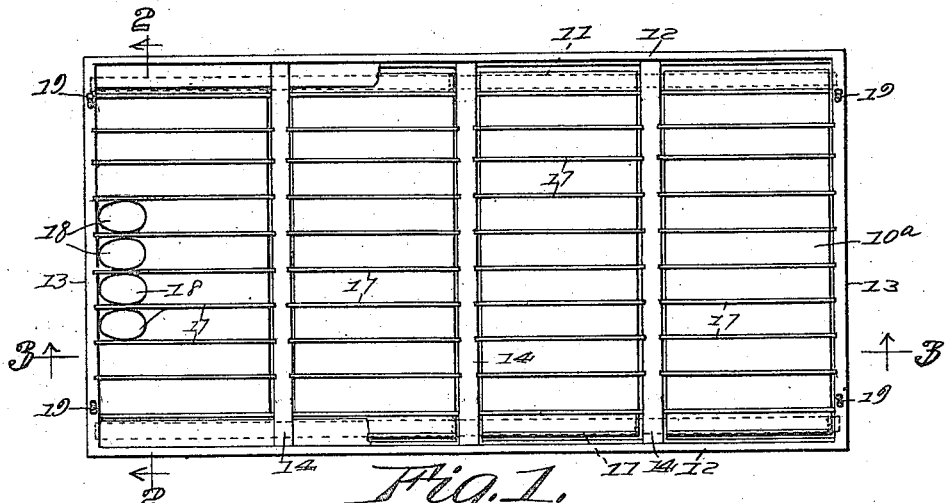
Figure 1 is a plan view of the device partly broken away.
Figure 2:
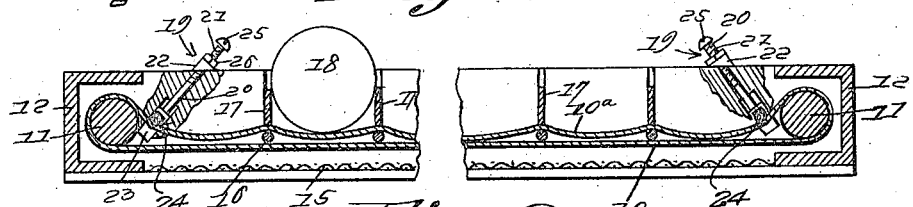
Figure 2 is a transverse section on the plane indicated by the line 2—2 of Figure 1.

The egg support consists of an endless apron 10 traversing parallel side rollers 11 preferably mounted in channeled side bars 12 of a frame having end bars 13 and intermediate cross bars or partitions 14, the lower side of the frame beneath the apron being fitted with a gauze wire screen 15.

The upper or supporting run 10ª of the apron is preferably elevated a considerable distance above the plane of the lower run thereof and is carried by guide rods or rolls 16 above which are located cell bars 17 terminally supported by the end and cross bars of the frame parallel with the side bars of the latter and spaced apart to accommodate a single row or series of eggs indicated at 18.

Obviously the turning of either of the rollers 11 causing a corresponding feeding movement of the apron will produce a turning movement of the eggs which are confined and held against movement with the apron by the cell bars 17, and in order that the apron may be maintained at such a tension as to insure the communication of motion thereto from the rollers, tensioning devices 19 are employed in relation to each roller and consist in the construction illustrated of tension rods 20 threaded as at 21 in suitable collars 22 and carrying swiveled yokes 23 in which are mounted bearing rolls 24 arranged in contact with the apron and serving to apply pressure thereto without interfering with the progressive movement thereof. The tension rods are provided with kerfed heads 25 to provide for turning the same by means of a screw driver or similar tool and locking nuts 26 are fitted upon the stems to secure them in their adjusted positions. The bearing rollers 14 extend parallel with the apron carrying rollers 11 in the intervals between the cross bars and frame end bars 14 and 13.

Figure 3:
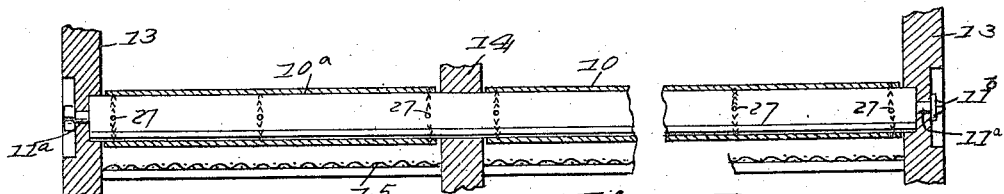
Figure 3 is a longitudinal section on the plane indicated by the line 3—3 of Figure 1.
Figures 4, 5:
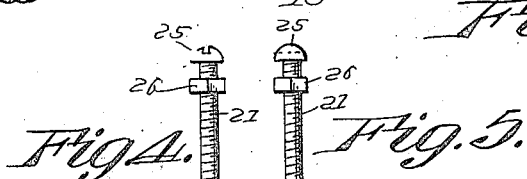
Figures 4 and 5 are detail views of the belt tightener stem.

As a further means of insuring the feeding of the apron by the carrying rollers spurs 27, as indicated in Figure 3, are attached to the said rollers to engage the apron, although obviously the spurs may be formed directly on the rollers.

In the construction illustrated the terminal spindle portions 11ª of the apron carrying rollers are provided with exterior heads 11ᵇ forming wrench seats to provide for turning the same as required or at intervals to reverse the positions of the eggs.

It will be understood that any suitable and available material of a sufficient flexibility may be employed in the construction of the apron as for example canvas, wire netting or screen or the equivalent thereof.

Having described the invention, what is claimed as new and useful is:—

1. An egg tray for incubators having a frame consisting of side and end bars and with cross bars connecting the side bars in parallelism with the end bars, an apron extending transversely of the frame and carried by rollers mounted parallel with the side bars, and cell bars arranged in parallel spaced relation in the intervals between the cross bars and end bars and spaced apart to accommodate single rows or series of eggs, the upper run of the apron being disposed adjacent to the lower edges of said cell bars, and being supported by carrier rolls arranged in the planes of said cell bars.

2. An egg tray for incubators having a frame consisting of side and end bars with cross bars connecting the side bars and in parallelism with the end bars, an apron extending transversely of the frame and carried by rollers mounted parallel with the side bars, cell bars arranged in parallel spaced relation in the intervals between the cross bars and end bars and spaced apart to accommodate single rows or series of eggs, the upper run of the apron being disposed adjacent to the lower edges of said cell bars, and being supported by carrier rolls arranged in the planes of said cell bars, the side bars being of channeled construction, and said rollers supporting the belt and being disposed between the flanges of the side bars.

3. An egg tray for incubators having a frame consisting of side and end bars with cross bars connecting the side bars and in parallelism with the end bars, an apron extending transversely of the frame and carried by rollers mounted parallel with the side bars, cell bars arranged in parallel spaced relation in the intervals between the cross bars and end bars and spaced apart to accommodate single rows or series of eggs, the upper run of the apron being disposed adjacent to the lower edges of said cell bars, and being supported by carrier rolls arranged in the planes of said cell bars, the side bars being of channeled construction, and said rollers supporting the belt and being disposed between the flanges of the side bars, bearing rolls disposed on top of the upper run of the apron and adjacent the side rolls, and tension rods mounted in the end bars and disposed diagonally with reference to the same and provided with swivel yokes engaging the extremities of the bearing rolls.

In testimony whereof he affixes his signature.

ALVIS L. JOHNSON.